United States Patent [19]

DeVlieg

[11] 4,006,941
[45] Feb. 8, 1977

[54] AIRCRAFT BRAKE CONTROL SYSTEM HAVING HYDROPLANING PROTECTION

[75] Inventor: Garrett H. DeVlieg, Bellevue, Wash.

[73] Assignee: The Boeing Company, Seattle, Wash.

[22] Filed: Jan. 8, 1976

[21] Appl. No.: 647,387

Related U.S. Application Data

[63] Continuation of Ser. No. 535,010, Dec. 20, 1974, abandoned.

[52] U.S. Cl. .......................... 303/103; 188/181 C; 244/111; 303/20
[51] Int. Cl.² .......................................... B60T 8/10
[58] Field of Search ............ 188/181 C; 235/150.2; 244/111; 317/5; 324/161; 340/53, 62; 303/93, 95, 96, 103, 106, 109, 20, 21

[56] References Cited

UNITED STATES PATENTS

| | | | |
|---|---|---|---|
| 3,260,555 | 7/1966 | Packer | 303/21 EB |
| 3,756,663 | 9/1973 | Fink et al. | 303/21 BE |
| 3,768,874 | 10/1973 | Riordan | 303/21 BE |
| 3,866,979 | 2/1975 | Rabus et al. | 303/21 AF |

*Primary Examiner*—Stephen G. Kunin
*Attorney, Agent, or Firm*—Conrad O. Gardner

[57] ABSTRACT

Aircraft velocity information signals are utilized to provide a brake release signal to one or more, but not more than half of the wheels in each locked wheel set e.g. the two rear wheels in a four wheel set on a gear, so that if all braked wheels lock up and hydroplane, the brake relase signal holds half the brakes released and when the released wheels come out of hydroplaning and spinup, then they, in turn, provide conventional locked wheel protection to the remaining wheels in the same locked wheel set.

3 Claims, 4 Drawing Figures

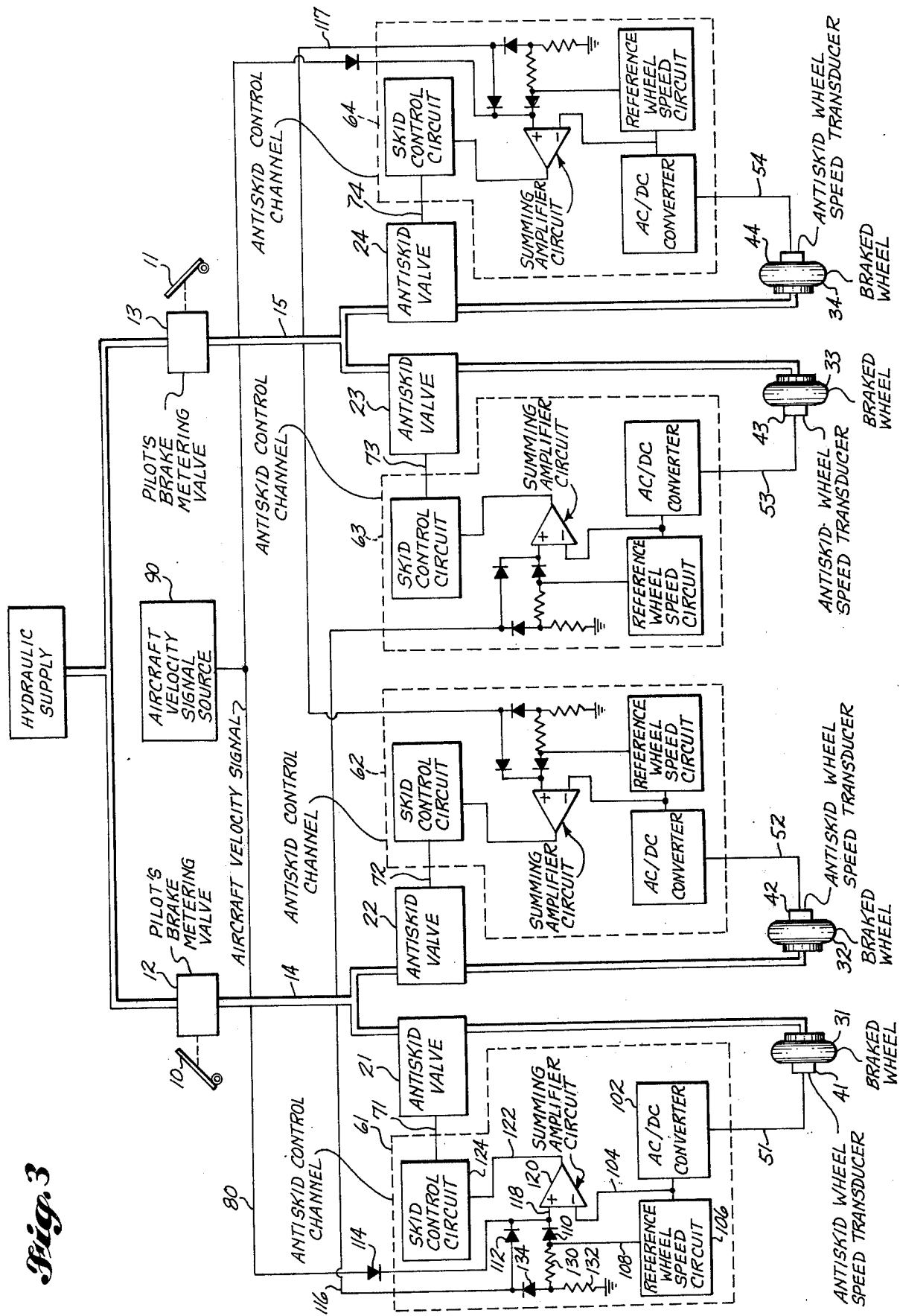

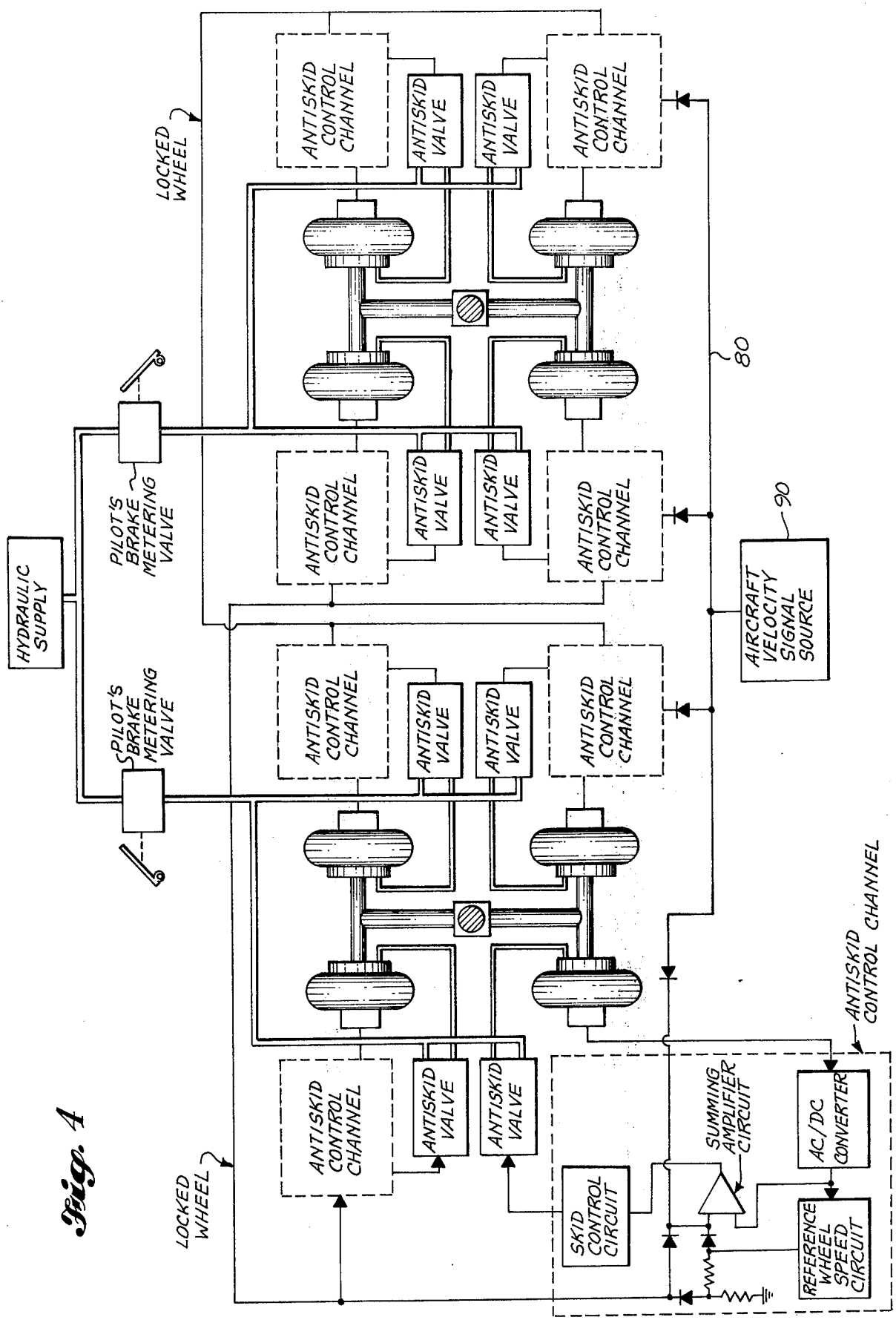

AIRCRAFT BRAKE CONTROL SYSTEM HAVING HYDROPLANING PROTECTION

This is a continuation, of application Ser. No. 535,010, filed Dec. 20, 1974, now abandoned.

This invention relates to aircraft antiskid control systems and more particularly to a system for providing brake release signals to half or less than half of the wheels of each locked wheel set when all the braked wheels lock up and hydroplane.

Present jet transport aircraft utilize antiskid systems to control wheel skidding during braking. These systems are needed because uncontrolled skids, or "lock-ups," result in greatly reduced braking effectiveness, loss of tire cornering ("road-holding") capability, and tire flatspots or blowouts. During most braking conditions, this skid protection is achieved by circuits or mechanisms which automatically release braking pressure to a single (or group of) wheel(s) upon detection of a sudden decrease in wheelspeed.

As a backup, some known antiskid systems also group braked wheels into "locked wheel sets." The purpose of such grouping is to provide gross skid protection or "locked wheel" protection under circumstances where normal antiskid protection is unable to do so such as during hydroplaning or during anti-skid failures. This locked wheel protection is achieved by comparing some function of the wheelspeeds of all the wheels in a set. When a wheel lockup occurs, the locked wheel anti-skid protection circuit detects the locked wheel as rotating considerably slower than the other wheels in the same set and releases brake pressure to the locked wheel to allow it to spin up.

A disadvantage of the aforementioned type locked wheel protection circuit is that when all the wheels in one locked wheel set are simultaneously locked up, then the logic assumes that the aircraft is stopped. Therefore, none of the brakes in the set are released to allow spinup, and the locked wheel condition continues uncorrected. Such a situation may occur at high speeds on wet runways where tires can hydroplane. Braking is applied which causes all the wheels to lock up. The aforementioned known antiskid and locked wheel protection releases the brakes, but the wheels do not immediately spin up due to the hydroplaning. After a short time interval, the antiskid and locked wheel protection assume that the aircraft must be stopped and allow reapplication of brakes. The wheels then remain locked until the aircraft stops or until the pilot releases the brake pedals.

As a consequence of the preceding it is an object of the present invention to provide means for holding the brakes in a released condition until the wheels stop hydroplaning and spin up, thereby permitting braking effectiveness and the cornering capabilities to be regained upon regaining runway friction.

It is a further object of this invention to provide means in combination with an antiskid braking system for preventing sets of wheels from locking up by providing hydroplane protection for the aft wheels of each set on each of the respective landing gear trucks.

It is yet another object of this invention to provide means for controlling locked wheel antiskid protection systems by deriving brake release signals representative of aircraft velocity from means exclusive of the braked wheels themselves, e.g. an unbraked nose gear wheel, INS, or Doppler radar speed sensor.

Yet a further object of the invention is to provide hydroplane protection in such a manner that all the braked wheels may be directly or indirectly protected, yet only half or less than half the wheels are affected due to any single failure.

The above and other features and objects of the present invention will become apparent upon a reading of the following description in conjunction with the accompanying drawings in which:

FIG. 3 is a schematic diagram showing a four wheel brake and antiskid system having locked wheel protecting utilizing in combination therewith a further signal representative of aircraft velocity which can provide hydroplaning protection; and, FIG. 4 is a further embodiment of the invention utilized in an aircraft having eight braked wheels.

Figure 1:
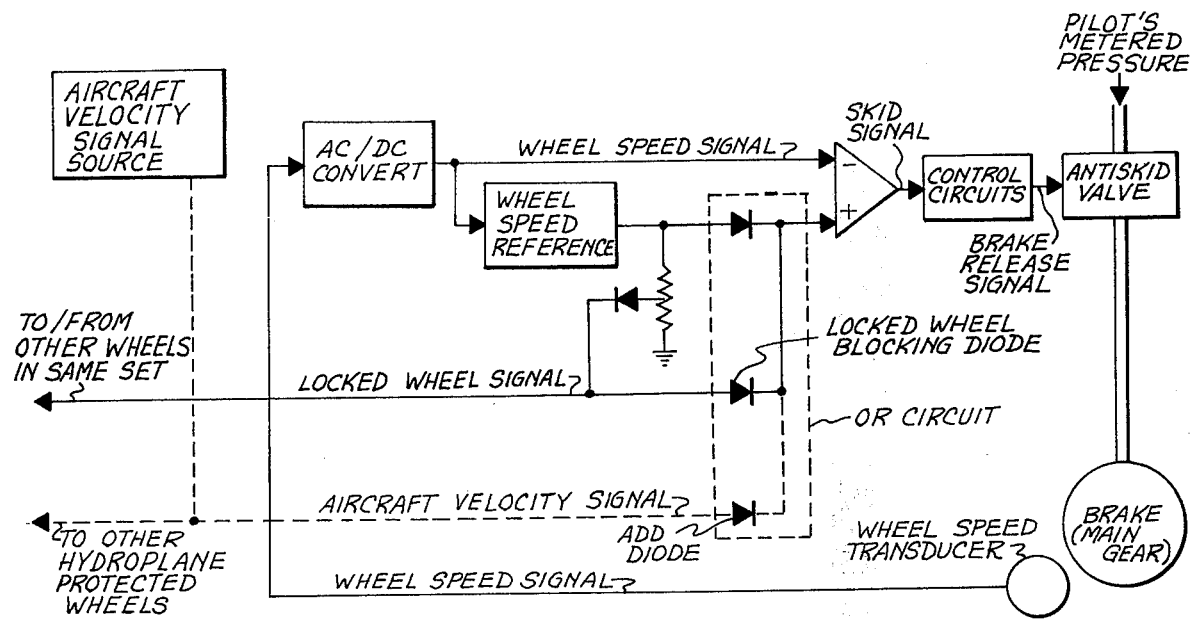
FIG. 1 is a simplified schematic diagram representative of prior art antiskid and locked wheel protection in solid lines with a dotted line representation of additional signal processing utilized in the present invention.
Figure 2:
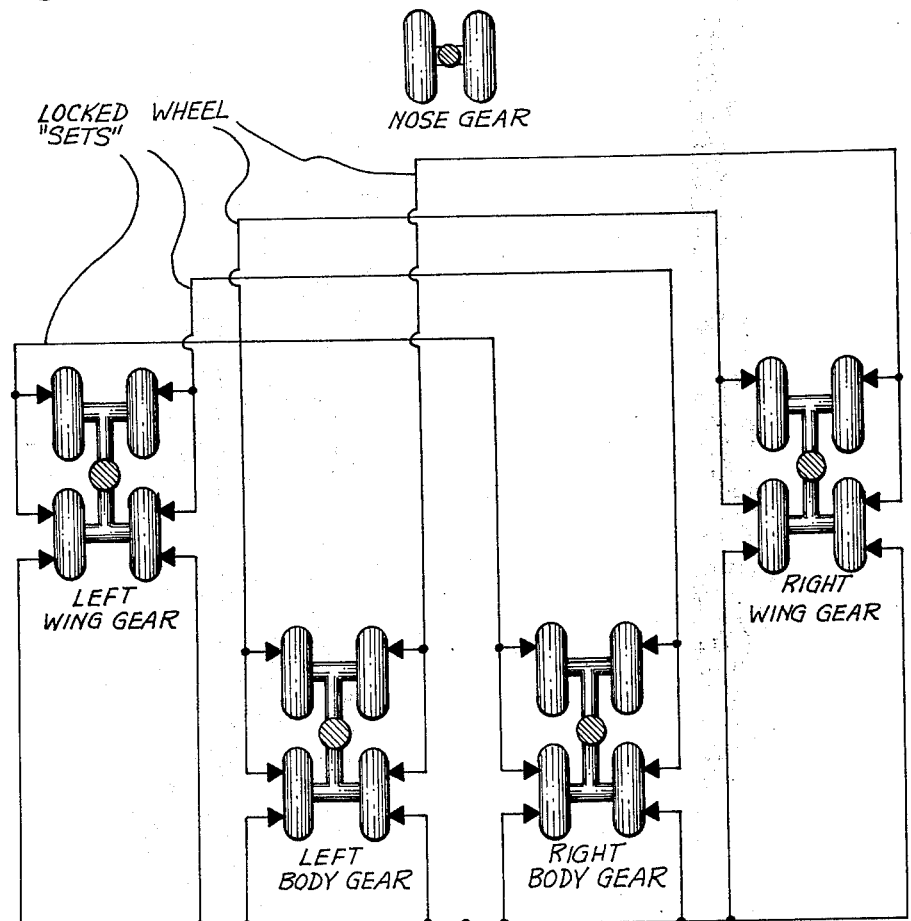
FIG. 2 is a simplified block diagram showing the wheels (2) in plurality (4) of locked wheel sets of 4 wheels each in an aircraft having 16 braked wheels, that are hydroplane protected by processing of aircraft velocity signals in the manner shown in FIG. 1.

Turning now to FIG. 1 deemed helpful in a preliminary understanding of the present invention it will be noted that a signal representative of aircraft velocity (shown in dotted line representation) is developed to provide the aforementioned hydroplane protection. The manner in which hydroplane protection is actually provided in multi-wheeled brake wheel systems is shown in the embodiments of FIGS. 2, 3, and 4. In FIG. 1, in solid line representation in accordance with the prior art, a wheelspeed transducer provides a wheelspeed signal which is processed to provide D.C. signals represent2tive of the actual wheelspeed and the reference wheelspeed (representative of synchronous wheelspeed) which are inputted to first and second terminals respectively of a summing amplifier circuit. The second terminal has the aforementioned reference signal diode coupled thereto and also the locked wheel signal diode coupled thereto, so that the reference signal at the second input terminal of the summing amplifier circuit becomes the greater of the reference wheelspeed signal and locked wheel signal. As shown in the dotted lines, in accordance with one feature of the present invention, a signal representative of aircraft velocity, derived from some source other than the wheelspeed transducer (such as an unbraked nose-wheel) which is providing the present wheelspeed velocity and reference signals, is further coupled in OR logic circuit configuration to the second terminal together with the aforementioned reference wheelspeed signal and locked wheel signals so that the reference signal input to the summing amplifier circuit becomes the greater of the three signals coupled thereto. During normal antiskid control the relative authority of the three signals is such that the reference wheelspeed signal is the largest in amplitude and thus provides the reference signal input to the summing amplifier circuit. The skid control signal at the output of the summing amplifier is representative of the difference between the signal representative of wheelspeed and the reference signal as determined by the largest of the three signals hereinbefore discussed. The skid control signal developed in the aforementioned manner is then coupled through to an antiskid valve to control brakes to correct a wheel skid condition. Other advantages besides hydroplane protection can flow as explained later in connection with system implementation of the above.

FIG. 2 is deemed helpful in briefly showing in flow chart format how the hydroplane protection developed from an aircraft velocity source sensor can be applied to control antiskid valves in a large multiwheeled braking system comprising four trucks each having four wheels and employing four locked wheel sets. From observation of the hydroplane protection signal flow paths developed from the sensor it can be seen that all the aft wheels on each truck are hydroplane protected in the manner discussed by way of specific circuit implementation as shown in FIG. 1, and that none of the forward wheels are so protected. This is for the reason that the forward wheels tend to plow away the water for the aft wheels, thus allowing the aft wheels to come out of hydroplaning first. This arrangement also assures that no single failure can cause more than a 50% braking less, and two of the four wheels in each locked wheel set, since hydroplane protected, provide hydroplane protection to all the wheels of the aircraft. In other words, aft wheels when they spin up, generate within their control circuits (shown in FIG. 1) a locked wheel signal which will, in turn, since coupled to the forward wheels, provide them with a signal to release brakes also, thus in effect causing all the aft and forward wheels to be protected.

The purpose of touchdown protection is to prevent wheel blowouts in the event the pilot applies brakes before the wheels spin up at touchdown. If a further means for generating a signal representative of aircraft velocity as indicated previously other than a braked wheel wheelspeed sensor is utilized to provide hydroplane protection and the signal provided is indicative of high speed of the aircraft prior to and immediately after touchdown, then if the wheels are not spun up as represented by the wheelspeed signal information, the respective brakes would be released, thereby providing the lockup protection previously discussed. Therefore it can be seen that by utilization of aircraft velocity signals from e.g. airspeed, INS or Doppler sensors, a touchdown protection feature of the present system is provided.

Turning now to the exemplary 4 braked wheel system of FIG. 3, it is seen that the pilot can independently command braking pressure to both sides of the aircraft by applying force to the left or right braking pedals 10 and 11. This in turn causes the left and right brake pressure metering valves 12 and 13, respectively, to apply left and right braking pressures as shown at 14 and 15 representative of the relative forces applied to the respective pedals. The braking pressures represented at 14 and 15 are then applied to antiskid control valves 21 and 22, and 23 and 24, respectively, which in turn control the pressure applied to braked wheels 31, 32, 33, and 34, respectively. Each braked wheel has associated respectively therewith wheelspeed transducer 41, 42, 43, and 44 which generate wheelspeed signals 51, 52, 53 and 54. Each wheelspeed signal is then coupled in its respective antiskid control channel 61, 62, 63, and 64 in known manner to compute antiskid valve command signals 71, 72, 73, and 74, respectively, each antiskid valve command signal then being coupled to its respective antiskid control valve 21, 22, 23, and 24 which in turn regulates pressure applied to the respective braked wheel in a manner protecting against skids.

Turning now to exemplary antiskid control channel 61 which operates in similar manner to antiskid control channels 62, 63, and 64, wheelspeed signal 51 is coupled to converter circuit 102 which generates a D.C. wheelspeed signal 104 representative of the speed of rotation of braked wheel 31. D.C. wheelspeed signal 104 is then coupled to reference wheelspeed computing circuit 106 which generates in known manner reference wheelspeed signal 108 which is substantially representative of the rotational speed that braked wheel 31 would attain if not skidding. Reference wheelspeed signal 108 is then coupled to diode 110, locked wheel signal 116 is coupled to diode 112, and aircraft velocity signal 80 is coupled to diode 114. The other terminals of diodes 110, 112, and 114 are then coupled together to a first terminal of summing amplifier circuit 120 so that the greatest amplitude signal of the three signals, aircraft velocity signal 80, locked wheel signal 116 OR wheelspeed reference signal 108 will provide a reference velocity signal 118 at the first terminal of summing amplifier circuit 120. The D.C. wheelspeed signal 104 is coupled to the second terminal of summing amplifier circuit 120 which generates a difference termed skid control signal 122 in the manner hereinbefore described in connection with the description of the circuit in FIG. 1. Skid control signal 122 is then coupled to skid control circuit 124 which generates antiskid valve command signal 71 to correct for a wheel skid condition.

An important feature of the present antiskid control channel is the means by which the reference speed signal 118 is generated. As previously mentioned, reference signal 118 is determined by whichever of reference wheelspeed signal 108, OR locked wheel signal 116, OR aircraft velocity signal 80 is the greater. During normal antiskid control, reference wheelspeed signal 108 is the maximum and provides reference signal 118. If a system failure occurs, or the wheel fails to recover from a skidding condition due to hydroplaning or lack of tire/ground contact, then reference wheelspeed signal 108 will be substantially zero amplitude and one of the other two signals, locked wheel signal 116 or aircraft velocity signal 80 whichever is of greater amplitude, must be relied upon to provide the signal 118 so that the skid control channel can detect the wheel skid condition and command corrective action.

Turning now to the locked wheel protection circuitry, it will be observed that reference wheelspeed signal 108 is coupled to resistor 130, which in turn is coupled to resistor 132 and diode 134. Resistor 132 is coupled to a reference potential and diode 134 is coupled to diode 112 and to an identical circuit in antiskid control channel 63. If the reference wheelspeed signal 108 in antiskid control channel 61 is greater than the corresponding signal in antiskid control channel 63, then the locked wheel signal 116 is less than, but representative of, reference wheelspeed signal 108. If a sustained locked wheel condition occurs to braked wheel 31, then the reference wheelspeed signal 108 will reduce to substantially zero. However, if braked wheel 33 is rolling normally, then the locked wheel circuit within antiskid control channel 63 will generate a locked wheel signal 116 which is representative of the speed of braked wheel 33, and provide a reference speed signal 118 to correct the skidding condition of braked wheel 31. Then, once braked wheel 31 begins to rotate, it will generate its own reference speed signal by means of reference wheelspeed signal 108 and regain normal skid control.

Returning now to a key feature of the present system, viz. the processing and utilization of aircraft velocity signal 80, it should be noted that prior to aircraft touchdown or during periods of tire hydroplaning, a situation can occur wherein substantially all of the braked wheels may simultaneously be in a full skidding or locked up condition. When that occurs, some reference speed signal is required within the antiskid control channel to generate an antiskid valve command signal causing the antiskid valve to release the brake pressure allowing wheel spinup. Without such a signal the braked wheels would probably remain locked up resulting in possible tire damage and consequent potential loss of control of the aircraft. The reference wheelspeed signal cannot generate such a signal because it relies upon the D.C. wheelspeed signal which is at zero. The locked wheel signal cannot generate such a signal because it relies upon the reference wheelspeed signal of another wheel which is presumably also zero amplitude. From the preceding it can be seen how the present invention discloses a means by which a signal representative of aircraft velocity can be utilized in a manner to generate a reference speed signal which is compared with actual wheelspeed in summing amplifier circuit 120 to insure brake release and consequently provide skid protection. The source of aircraft velocity signal 80 is shown in FIG. 3 as aircraft velocity signal source 90. Source 90 comprises a means for measuring aircraft velocity when all braked wheels in the braking system are locked up and is thus exclusive of braked wheel wheelspeed sensors but may however therefore include an unbraked nose wheel wheelspeed sensor, or a signal derived in known manner from the aircraft inertial navigation system which is substantially representative of aircraft forward velocity, of such a signal derived in known manner from an aircraft-mounted Doppler Radar Ground Speed Measuring System, or a signal derived in known manner from an aircraft pitot tube.

The aircraft velocity signal 80 thus derived from aircraft velocity signal source 90 is coupled through isolation diodes into antiskid control channels 61 and 64, and not coupled to antiskid control channels 62 and 63. It is noted here that locked wheel signal 116 is coupled to antiskid control channels 61 and 63, and an identical but separate locked wheel signal 117 is coupled to control channel 62 and 64. By coupling aircraft velocity signal 80 and locked wheel signals 116 and 117 to antiskid control channels 61, 62, 63, and 64 as hereinabove described, no single failure can degrade skid control on more than half of the braked wheels. Also, by coupling the aircraft velocity signal 80 to only one of each of the two antiskid control circuits coupled together by a common locked wheel signal (antiskid control circuit 61 having antiskid control circuits 61 and 63 coupled by locked wheel signal 116 and antiskid control circuit 64 having antiskid control circuits 62 and 64 coupled by locked wheel signal 117) then one of the two wheels in each locked wheel set is protected against sustained lockups by the presence of aircraft velocity signal 80. This, in effect, protects all the braked wheels against sustained lockups due to brake application before touchdown or hydroplaning in that when the wheel protected by the aircraft velocity signal 80 begins to rotate, an associated locked wheel signal, 116 or 117 as applicable, will be generated when braked wheel 31 or 34, respectively, spins up and then provide reference speed signals within antiskid control circuit channels 63 and 62, respectively, by means of the aforementioned locked wheel signal coupling.

FIG. 4 is illustrative of an embodiment of the invention in an aircraft having eight braked wheels. The known aspects of the system of FIG. 3 hereinbefore described can be similarly found in FIG. 4 except that each of the two brake metering valves shown is coupled to four brake antiskid control channels instead of two. Also similarly, it should be noted that with the eight antiskid control channels present in FIG. 4, there are two locked wheel sets of four wheels in each set, and that each locked wheel set comprises two pairs of forward and rear wheels on the same landing gear truck. In this configuration, the aircraft velocity signal 80 is coupled to both the rear wheels in each locked wheel set and not coupled to the forward wheels in each locked wheel set. As an additional feature, in a truck type landing gear, the rear wheels are preferred coupling for effective hydroplane protection since it has been found in actual tests that on flooded runways, the forward wheels of a truck tend to plow through the water for the rear wheels thereby providing the rear wheels with a better tire-to-runway friction surface and allowing the rear wheels to spin up to synchronous speed sooner.

By coupling the hydroplane and locked wheel protection as shown in FIG. 4, no single failure of either the locked wheel or hydroplane protection circuits can degrade braking capability of more than half the braked wheels. Also, in this embodiment, any such failure would also affect only half the braked wheels on each side of the aircraft, thus insuring more or less symmetrical distribution of remaining braking.

Embodiments of the invention having the aforementioned hydroplane protection in aircraft having antiskid protection can now be recognized as including the provisions of having at least two independent sets of antiskid control channels coupled together for locked wheel protection, and the coupling of a signal representative of aircraft velocity to at least one but not more than half of the antiskid control channels of each locked wheel set.

I claim:

1. In an antiskid braking system for an aircraft, the combination of:
 a rotatable wheel;
 means to supply hydraulic braking pressure to the wheel;
 valve means to adjustably restrict the hydraulic pressure actually applied to the wheel;
 means for providing a signal representative of the wheelspeed of said wheel;
 wheelspeed reference signal generating means responsive to said previous means for providing a signal representative of the synchronous speed of said wheel;
 means for providing a locked wheel signal;
 means for providing a signal representative of the velocity of said aircraft;
 means for comparing said signal representative of the wheelspeed of said wheel with said signal representative of the synchronous speed of said wheel, OR said locked wheel signal, OR said signal representative of the velocity of said aircraft and supplying a brake release signal through circuit means to said valve means.

2. In an antiskid braking system for an aircraft, the combination of:
- a rotatable wheel;
- means to supply hydraulic braking pressure to the wheel;
- valve means to adjustably restrict the hydraulic pressure actually applied to the wheel;
- means for providing a signal representative of the wheelspeed of said wheel;
- means responsive to rotation of a further wheel for providing a locked wheel signal;
- means for providing a signal representative of the velocity of said aircraft during lock up of all braked wheels of said aircraft;
- means for comparing said signal representative of said wheel with both said locked wheel signal AND said signal representative of the velocity of said aircraft and supplying a brake release signal through circuit means to said valve means if said wheel signal representative of the wheelspeed of said wheel is less than either said locked wheel signal OR said signal representative of the velocity of said aircraft during lock up of all braked wheels of said aircraft.

3. In combination in an aircraft having brakes for at least two groups of wheels:
- hydraulic circuit means for applying brake pressure to said brakes of said at least two groups of wheels, each group including at least two wheels;
- antiskid circuit means for controlling brake pressure at said wheels in said at least two groups in response to a skidding condition of said wheels in said at least two groups;
- said antiskid circuit means in each of said at least two groups of wheels including locked wheel protection circuit means;
- said locked wheel protection circuit means providing a locked wheel protection signal to a first wheel upon rotation of a further wheel; and
- means responsive to the velocity of said aircraft during lock up of all braked wheels of said aircraft for releasing brake pressure to at least one but not more than half of the wheels in each of said at least two groups of wheels.

* * * * *